April 24, 1928.
W. MACKIE
1,667,632
ROLL FOR SUGAR CANE AND LIKE MILLS
Filed Jan. 25. 1924
2 Sheets-Sheet 1
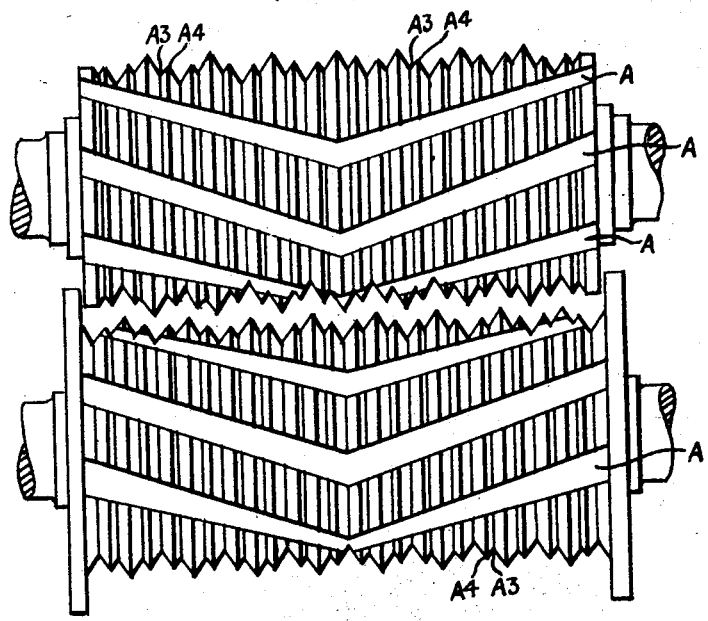
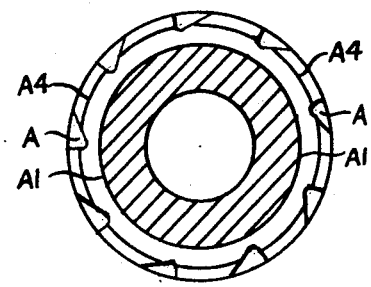
INVENTOR:-
WILLIAM MACKIE
by his Attorneys
Howson and Howson April 24, 1928.

W. MACKIE 1,667,632

ROLL FOR SUGAR CANE AND LIKE MILLS

Filed Jan. 25. 1924    2 Sheets-Sheet 2

INVENTOR:-
WILLIAM MACKIE
by his Attorneys
Howson and Howson

Patented Apr. 24, 1928.

1,667,632

UNITED STATES PATENT OFFICE.

WILLIAM MACKIE, OF GLASGOW, SCOTLAND.

ROLL FOR SUGAR-CANE AND LIKE MILLS.

Application filed January 25, 1924, Serial No. 688,535, and in Great Britain October 18, 1923.

The invention relates to sugar-cane and like mill-rolls of the type having intermeshing circumferential or helical surface grooves, and has for its object an improved form and contour of grooving applicable (it may be in varying pitches and proportions) throughout the mill and also—and more particularly—to pairs of preliminary crushing rolls of which there may be any convenient number.

In a roll according to the invention there is a primary series of grooves the sectional contour of which is triangular—the flanks lying at equal and opposite angles to planes of rotation bisecting them. Upon the flanks of these triangular grooves there are formed any convenient number of secondary grooves (and corresponding counterpart projections). These secondary grooves are in contour similar to the primary grooves—that is to say, they are preferably equi-angular,—alternatively however, they may be of unequal angles—for instance one surface may be peripheral.

The points of the projections and the roots of either or both primary and secondary grooves may be flattened or rounded. Both primary and secondary grooves constitute a series of acute-angled circular wedges, the former of the full diameter of the roll, the latter of less than the full diameter of the roll.

A roll made according to the invention thus gives greater gripping capacity, more crushing surface and more channels for the outlet of juice than is obtained when the flanks of the primary grooves are left plain as usual.

Figure 3:
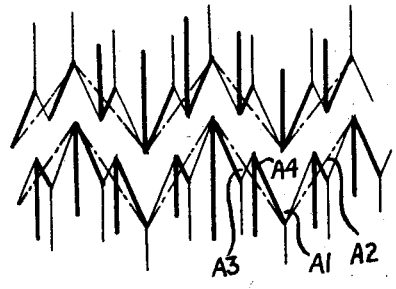
Figure 4:
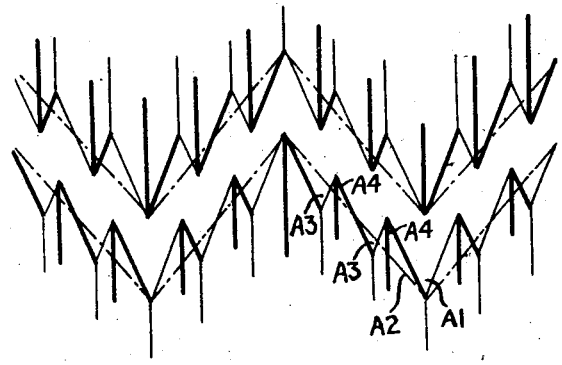
Figure 5:
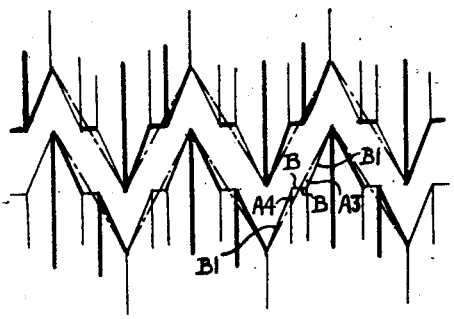

Several examples of the invention are shown diagrammatically on two accompanying sheets of explanatory drawings in which Figure 1 is a front elevation, Figure 2 a cross sectional view of one roll and Figure 3, sheet 2, a part view in front elevation to an enlarged scale of the first example. Figures 4 and 5, are part views in front elevation and Figures 6 and 7, part views in cross-sectional elevation of four further examples.

In the examples shown in Figures 1, 2 and 3, each roll has usual helical grooves A, and according to the invention, the usual circumferential grooves $A^1$ which are of triangular section and have flanks $A^2$ lying at equal and opposite angles to planes of rotation (shown in chain lines in Figure 2) have formed in them a series of secondary grooves $A^3$ and counterpart projections $A^4$ these grooves and projections also having flanks equiangular to planes of rotation.

The example shown in Figure 4 differs from the first example only in that two series of secondary grooves $A^3$ and counterpart projections $A^4$ are formed in the flanks of the primary circumferential grooves $A^1$.

In the example shown in Figure 5 the secondary grooves $A^3$ and the counterpart projection $A^4$ have each one flank B peripheral. The second flanks $B^1$ of the groove and of the projection are inclined to the plane of rotation as in the previous examples.

Figure 6:
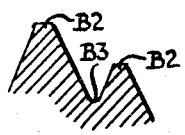
Figure 7:
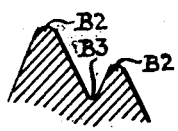

In the example shown in Figures 6 and 7, the points $B^2$ of the projections and the roots $B^3$ of the secondary grooves are filleted or flattened and rounded respectively.

What I claim is:

In a mill for breaking, crushing and shredding sugar cane, fed side-on or end-on, co-operating horizontal rolls each having a crushing surface constituted by a series of equi-spaced acute-angled circular wedges each of the full diameter of the roll and each having two flanks equally and oppositely inclined to the plane of rotation and each of the same depth, and intermediate said wedges circular wedges each of less than the full diameter of the roll and each having two flanks equally and oppositely inclined to the plane of rotation, at the same inclination to said plane as the flanks of said first named wedges, adjacent wedges presenting between them V-shaped grooves differently spaced from the axis of the roll, a plane of rotation equispaced from the apexes of two adjacent wedges of the full diameter of the roll containing the bottom of the groove between two intermediate wedges, the said apexes and said groove bottom defining acute-angled imaginary wedge-surfaces having equally inclined flanks, the apexes of said intermediate wedges projecting beyond said imaginary surfaces and the bottoms of the grooves between said first named wedge and said intermediate wedges being nearer the axis of the roll than said imaginary surfaces, the apexes of all the wedges of one roll being coplanar with the bottoms of grooves formed in the other roll.

In testimony whereof I have signed my name to this specification.

WILLIAM MACKIE.